(12) United States Patent
Sandhu et al.

(10) Patent No.: US 11,052,725 B2
(45) Date of Patent: Jul. 6, 2021

(54) AUTOMATIC WINDSHIELD DEFROSTING SYSTEM

(71) Applicant: Ford Global Technologies, LLC, Dearborn, MI (US)

(72) Inventors: Harminder Singh Sandhu, Northville, MI (US); David Marvin Gersabeck, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 60 days.

(21) Appl. No.: 16/583,412

(22) Filed: Sep. 26, 2019

(65) Prior Publication Data
US 2021/0094386 A1  Apr. 1, 2021

(51) Int. Cl.
*B60H 1/00* (2006.01)

(52) U.S. Cl.
CPC ..... *B60H 1/00785* (2013.01); *B60H 1/00657* (2013.01); *B60H 1/00792* (2013.01); *B60H 1/00814* (2013.01)

(58) Field of Classification Search
CPC .................................................. B60H 1/00785
See application file for complete search history.

(56) References Cited

U.S. PATENT DOCUMENTS

| | | | |
|---|---|---|---|
| 4,867,561 A * | 9/1989 | Fujii | B60H 1/00785 356/239.8 |
| 4,920,755 A * | 5/1990 | Tadahiro | B60H 1/00785 165/223 |
| 5,697,223 A * | 12/1997 | Ishii | B60H 1/00785 165/231 |
| 5,934,987 A * | 8/1999 | Baruschke | B60H 1/00849 454/75 |
| 6,052,998 A * | 4/2000 | Dage | B60H 1/00735 62/178 |
| 8,694,205 B1 * | 4/2014 | Yerke | B60H 1/00742 701/36 |
| 8,745,998 B2 | 6/2014 | Delorme et al. | |
| 10,053,059 B1 * | 8/2018 | Worthen | B60H 1/00785 |
| 10,220,675 B1 | 3/2019 | Reed | |
| 10,225,350 B2 | 3/2019 | Penilla | |

(Continued)

FOREIGN PATENT DOCUMENTS

| | | | | |
|---|---|---|---|---|
| CN | 103847697 A | * | 6/2014 | ................ B60S 1/66 |
| CN | 102991440 B | | 4/2015 | |

(Continued)

*Primary Examiner* — Nelson J Nieves
(74) *Attorney, Agent, or Firm* — David Coppiellie; Price Heneveld LLP

(57) ABSTRACT

A climate control system for a vehicle comprises a defroster assembly having a temperature sensor that detects an interior temperature of an interior of the vehicle, a camera disposed within the interior that has a lens facing a windshield, and at least one vent directed at the windshield. A body controller that, responsive to a temperature of the interior being less than a temperature threshold, and a light refractive index of the windshield being less than an opacity threshold, outputs a status of the windshield. A telematics communication system that, responsive to the status from the body controller, transmits a notification to an application stored on a mobile telecommunications device.

12 Claims, 4 Drawing Sheets

(56) References Cited

U.S. PATENT DOCUMENTS

| | | | |
|---|---|---|---|
| 2002/0121972 A1* | 9/2002 | Schofield | G06K 9/00791 340/438 |
| 2007/0227718 A1 | 10/2007 | Hill et al. | |
| 2008/0168785 A1* | 7/2008 | Sauer | B60H 1/00785 62/176.6 |
| 2010/0106363 A1* | 4/2010 | Mandujano | B60H 1/00657 701/36 |
| 2010/0163220 A1* | 7/2010 | Nakajima | B60H 1/00785 165/202 |
| 2011/0238263 A1* | 9/2011 | Fuse | B60H 1/00785 701/36 |
| 2013/0103257 A1* | 4/2013 | Almedia | B60Q 1/20 701/36 |
| 2015/0017900 A1* | 1/2015 | Baek | B60H 1/00742 454/75 |
| 2015/0181173 A1* | 6/2015 | Paek | G06K 9/00798 348/148 |
| 2015/0266357 A1* | 9/2015 | Bidner | B60H 1/00778 165/288 |
| 2016/0091714 A1* | 3/2016 | Hui | H04N 7/183 359/512 |
| 2016/0339767 A1* | 11/2016 | Enomoto | B60H 1/00278 |
| 2017/0106721 A1* | 4/2017 | Hoke | B60S 1/023 |
| 2017/0246930 A1* | 8/2017 | Ochiai | B60H 1/00849 |
| 2017/0253201 A1* | 9/2017 | Maeshiro | G06K 9/00791 |
| 2017/0332010 A1* | 11/2017 | Asakura | G05D 1/0223 |
| 2018/0117988 A1* | 5/2018 | Sarnia | B60H 1/00785 |
| 2018/0222281 A1* | 8/2018 | Tamane | B60H 1/00657 |
| 2018/0272945 A1* | 9/2018 | Worthen | B60R 1/0602 |
| 2018/0272946 A1* | 9/2018 | Worthen | B60R 1/06 |
| 2019/0061468 A1* | 2/2019 | Reed | B60H 1/00778 |
| 2019/0061640 A1* | 2/2019 | Jefferson | B60H 1/00821 |
| 2019/0084381 A1* | 3/2019 | Daniel | B60H 3/02 |
| 2019/0359175 A1* | 11/2019 | Wang | B60H 1/00785 |
| 2020/0062085 A1* | 2/2020 | Adachi | B60J 1/002 |
| 2020/0101818 A1* | 4/2020 | Holmstrom | B60H 1/00371 |
| 2020/0215876 A1* | 7/2020 | Hironaka | B60S 1/026 |
| 2020/0269660 A1* | 8/2020 | Sasaki | G01J 5/00 |
| 2020/0282804 A1* | 9/2020 | Tashiro | B60H 1/00785 |
| 2020/0346511 A1* | 11/2020 | Hasegawa | B60H 1/00849 |

FOREIGN PATENT DOCUMENTS

| | | | | |
|---|---|---|---|---|
| CN | 205022537 U | | 2/2016 | |
| CN | 105416173 A | | 3/2016 | |
| CN | 105459968 A | | 4/2016 | |
| CN | 107351660 A | * | 11/2017 | |
| EP | 0950587 A1 | * | 10/1999 | B60H 1/00785 |
| JP | 62286826 A | * | 12/1987 | B60H 1/00785 |
| JP | 2012228916 A | * | 11/2012 | B60S 1/0844 |
| JP | 2019093794 A | * | 6/2019 | G03B 17/55 |
| KR | 20090020912 A | | 2/2009 | |
| KR | 20090020914 A | | 2/2009 | |
| KR | 101426801 B1 | * | 8/2014 | |
| WO | WO-2013007627 A1 | * | 1/2013 | B60H 1/3207 |

* cited by examiner

AUTOMATIC WINDSHIELD DEFROSTING SYSTEM

FIELD OF THE INVENTION

The present disclosure generally relates to climate control systems for vehicles. More particularly, the present disclosure relates to climate control systems that automatically defrost a vehicle windshield.

BACKGROUND OF THE INVENTION

Vehicles typically employ climate control systems to control a temperature within an interior area of the vehicle. The climate control systems allow for temperature manipulation based on user preference. Climate control systems may vary control parameters, such as, but not limited to, temperature and fan speed based on individual preference. Individual control of the climate control system allows the interior of the vehicle to be customized according to a user's preference. For example, during operation of the vehicle, such as when an engine or a motor for the vehicle is running, or turning, or in response to a remote start signal, the climate control system may be activated according to the user preference. Again, activating the climate control system based on preferences of a user provides vehicle customization.

SUMMARY OF THE INVENTION

According to a first aspect of the present disclosure, a climate control system for a vehicle comprises a defroster assembly having a temperature sensor that detects an interior temperature of an interior of the vehicle, a camera disposed within the interior that has a lens facing a windshield, and at least one vent directed at the windshield. A body controller that, responsive to a temperature of the interior being less than a temperature threshold, and a light refractive index of the windshield being less than an opacity threshold, outputs a status of the windshield. A telematics communication system that, responsive to the status from the body controller, transmits a notification to an application stored on a mobile telecommunications device.

Embodiments of the first aspect of the disclosure can include any one or a combination of the following features:
- the defroster assembly has at least one humidity sensor disposed on an outer surface of the windshield that detects moisture on the windshield such that, responsive to a moisture level from the humidity sensor being less than a moisture threshold, the body controller outputs the status;
- the telematics communication controller, responsive to interaction with the application on the mobile telecommunications device from the notification, wakes the body controller to start the vehicle and activates the defroster assembly such that the vent directs air having an air temperature being greater than the temperature threshold to the windshield;
- the interaction between the telematics communication controller and the mobile telecommunications device is a pre-defined response stored on the application;
- the body controller wakes the defroster assembly in predetermined intervals to determine the status;
- the predetermined intervals are defined based on usage data being indicative of a travel pattern of the vehicle; and
- the predetermined intervals are defined based on environment data exterior to the vehicle.

According to a second aspect of the present disclosure, a vehicle comprises a windshield having outer and inner surfaces. A climate control system having a defroster assembly includes at least one vent directed at the inner surface; at least one humidity sensor disposed on the outer surface; a camera disposed within an interior of the vehicle such that a lens faces the inner surface; a body controller that, responsive to a moisture level from the humidity sensor being greater than a moisture threshold and a light refractive index of the windshield being less than an opacity threshold, outputs a status of the windshield to an embedded modem; and a telematics communication system including a cloud server that interfaces with the body controller via the modem such that, responsive to the status, the cloud server transmits a notification through an application on a mobile device exterior to the vehicle.

Embodiments of the second aspect of the disclosure can include any one or a combination of the following features:
- the climate control system includes a temperature sensor that detects a temperature of an interior of the vehicle such that, responsive to a moisture level from the humidity sensor being less than a moisture threshold, the body controller outputs the status;
- the application stores pre-defined responses as settings data such that, responsive to the notification, the mobile device transmits the settings data to the cloud server that instructs the body controller to start the vehicle and activate the climate control system to initiate airflow from the vent based on the settings data;
- the settings data is indicative of control parameters for the climate control system;
- the body controller wakes the climate control system in predetermined intervals to determine the status;
- the predetermined intervals are defined based on usage data being indicative of a travel pattern of the vehicle; and
- the predetermined intervals are defined based on environment data exterior to the vehicle.

According to a third aspect of the present disclosure, a body control module for a vehicle interior comprises a controller that, responsive to a temperature of the vehicle interior from a temperature sensor being less than a temperature threshold and a moisture level from a humidity sensor disposed on an outer surface of the windshield being greater than a moisture threshold, outputs a status of the windshield. An embedded modem that, responsive to the status, notifies, via a cellular network, a cloud server to push a notification indicative of the status to an application stored on a mobile device exterior to the vehicle.

Embodiments of the third aspect of the disclosure can include any one or a combination of the following features:
- the controller, responsive to a light refractive index of the windshield from a camera disposed in the interior such that a lens faces an inner surface of the windshield being less than an opacity threshold, outputs the status;
- the application stores pre-defined responses as settings data such that, responsive to the notification, the mobile device transmits the settings data to the cloud server that instructs the body controller to start the vehicle and activate the climate control system to initiate airflow from the vent based on the settings data;
- the controller wakes the climate control system in predetermined intervals to determine the status;

the predetermined intervals are defined based on usage data being indicative of a travel pattern of the vehicle; and the predetermined intervals are defined based on environment data exterior to the vehicle.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
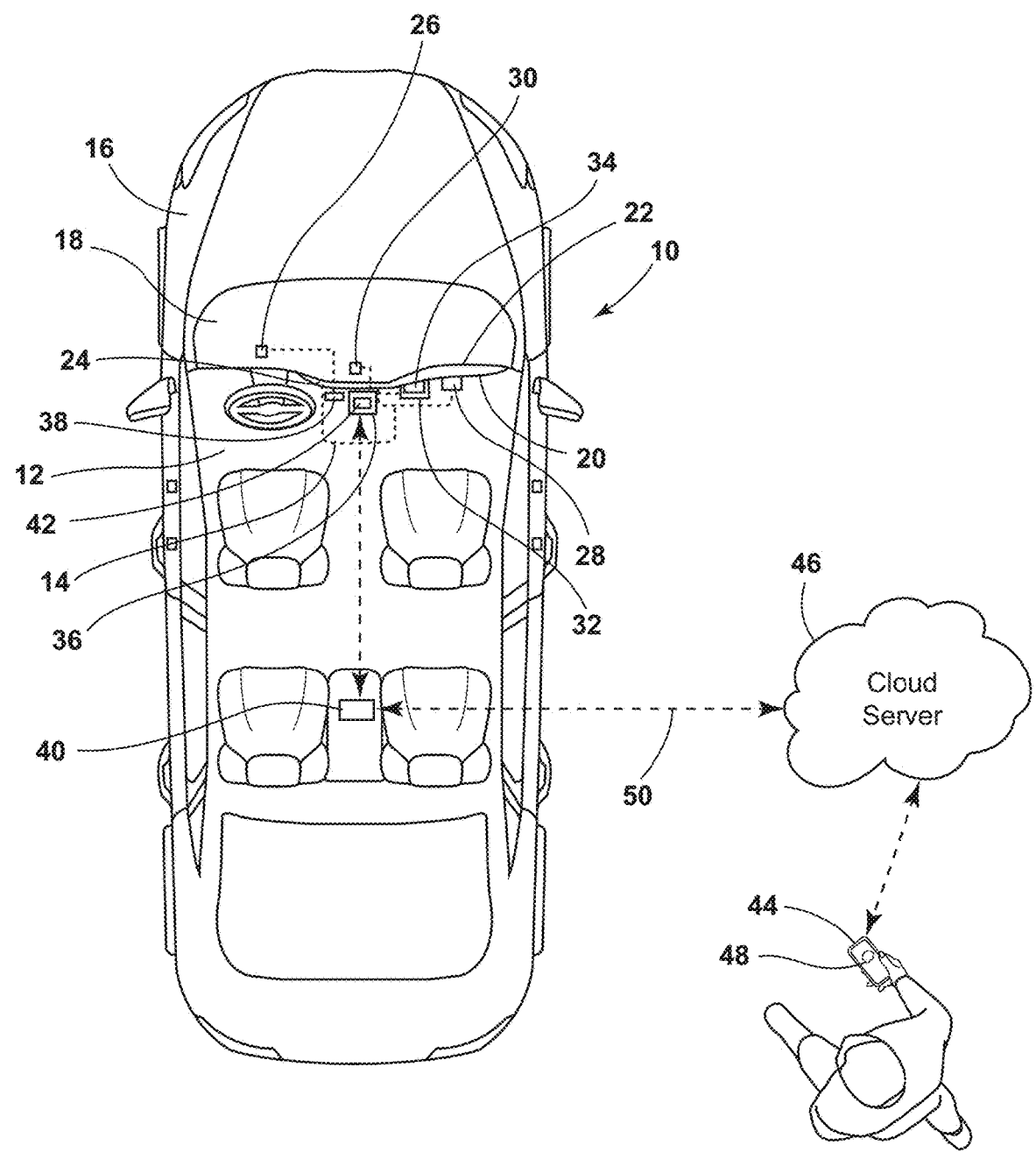
FIG. 1 is a schematic, top view of a vehicle having a climate control system, according the present disclosure.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction, or the like, does not mean that the feature or component follows a straight line or axis in such a direction or that it only extends in such a direction or on such a plane without other directional components or deviations, unless otherwise specified.

FIG. 1 depicts a top, schematic view of a vehicle 10. The vehicle 10 has an interior area 12. The interior area 12 may include a climate control system 14. The interior area 12 may be separated from an exterior area 16 of the vehicle 10 by a windshield 18. Stated differently, the windshield 18 has an inner surface 20 within the interior area 12 and an outer surface 22 that is exterior to the vehicle 10 in the exterior area 16. The climate control system 14 may further include a defroster assembly 24. The defroster assembly 24 may be disposed within the interior area 12 and be configured to defrost the outer surface 22 of the windshield 18. Specifically, the defroster assembly 24 directs air based on control parameters from the climate control system 14 at the inner surface 20 of the windshield 18 to effectuate heat transfer from the inner surface 20 to the outer surface 22 of the windshield 18. Effectuating heat transfer from the inner surface 20 to the outer surface 22 of the windshield 18 allows the defroster assembly 24 in the climate control system 14 to actively remove moisture from the outer surface 22 of the windshield 18. Actively removing moisture from the outer surface 22 of the windshield 18 further increases visibility through the inner and outer surfaces 20, 22 of the windshield 18.

The defroster assembly 24 may be disposed within the interior area 12 of the vehicle 10 and include at least one humidity sensor 26, first and second temperature sensors 28, 30, and a camera 32. The at least one humidity sensor 26 may be disposed on the outer surface 22 of the windshield 18. The humidity sensor 26 measures moisture on the outer surface 22 of the windshield 18. The first and second temperature sensors 28, 30 may be disposed in the interior and exterior areas 12, 16, respectively. Stated differently, the first temperature sensor 28 may detect an interior temperature of the interior area 12 of the vehicle 10, and the second temperature sensor 30 may detect an ambient temperature of the exterior area 16 of the vehicle 10. The first and second temperature sensors 28, 30 allow a comparison between the interior temperature of the interior area 12 of the vehicle 10 and the ambient temperature of the exterior area 16 of the vehicle 10. The interior temperature from the first temperature sensor 28 and the ambient temperature from the second temperature sensor 30 may also be used to activate the defroster assembly 24 of the climate control system 14. The camera 32 may be disposed in the interior area 12. The camera 32 may include a lens 34 that faces the windshield 18. Therefore, the camera 32 may be arranged such that the lens 34 records image data of the inner surface 20 of the windshield 18. The camera 32 may detect a light refractive index of the inner surface 20 of the windshield 18 to determine visibility through the inner and outer surfaces 20, 22 of the windshield 18.

The defroster assembly 24 may further include a body controller 36. The body controller 36 may be in communication with the humidity sensor 26, the first and second temperature sensors 28, 30, and the camera 32. The body controller 36 may analyze data from each of the humidity sensors 26, the first and second temperature sensors 28, 30, and the camera 32 to determine a status of the windshield 18. For example, if a moisture level from the humidity sensor 26 on the outer surface 22 of the windshield 18 is greater than a moisture threshold, and the second temperature sensor 30 detects an ambient temperature being less than the temperature threshold, the body controller 36 may activate the climate control system 14 such that air flows through a vent 38 of the defroster assembly 24.

In this example, the temperature threshold is equal to 32° F., or 0° C. Therefore, if the moisture level on the outer surface 22 of the windshield 18 is greater than a moisture threshold, and the ambient temperature is at or above a freezing point of the moisture on the outer surface 22 of the windshield 18 in the exterior area 16, the body controller 36 may determine that the windshield 18 may be occluded due to frozen moisture on the outer surface 22. In a similar manner, if the camera 32 detects image data of the inner surface 20 of the windshield 18 having a light refractive index being less than an opacity threshold and the interior temperature from the first temperature sensor 28 is below the temperature threshold, the body controller 36 may determine that the windshield 18 is occluded due to frozen moisture on the outer surface 22 of the windshield 18. The body controller 36 may activate the climate control system 14 such that air flows through the vent 38 of the defroster assembly 24 and contacts the inner surface 20 of the windshield 18. The air flowing through the vent 38 may be greater than the temperature threshold to effectuate heat transfer through the windshield 18 from the inner surface 20 to the outer surface 22 to further aid in reducing frozen moisture on the outer surface 22.

The climate control system 14 may further include a telematics communication system 40. The telematics communication system 40 may be configured to interface with the body controller 36 through a modem 42 embedded in the body controller 36. The telematics communication system 40, via the modem 42, allows the body controller 36 to communicate a status of the windshield 18. The status of the windshield 18 may be determined by the body controller 36 using the humidity sensor 26, the first and second temperature sensors 28, 30, and the camera 32. Using the above examples, the body controller 36 may communicate via the modem 42 to the telematics communication system 40 a status of the windshield 18 being occluded based on the parameters previously discussed. Specifically, the telematics communication system 40, including the modem 42, allows the body controller 36 to communicate the status of the windshield 18 over a cellular, or wireless, network to a mobile telecommunications device 44 disposed external to the vehicle 10.

For example, the body controller 36 may communicate the status through the modem 42 to the telematics communication system 40, which transmits a notification of the status of the windshield 18 across a cellular network 50 to a cloud server 46. An application 48 stored on the mobile telecommunications device 44 assesses the notification from the cloud server 46 to inform a user of the mobile telecommunications device 44 of the status. Stated differently, the telematics communication system 40 may push the notification of the status from the body controller 36 over a cellular network 50 with the modem 42 through the cloud server 46 to the application 48 stored on the mobile telecommunications device 44 to inform a user of the status. This may allow the user of the mobile telecommunications device 44 to activate, or prearrange activation, the climate control system 14, including the defroster assembly 24, to effectuate heat transfer from the inner surface 20 to the outer surface 22 of the windshield 18 while remote from the vehicle 10.

Figure 2:
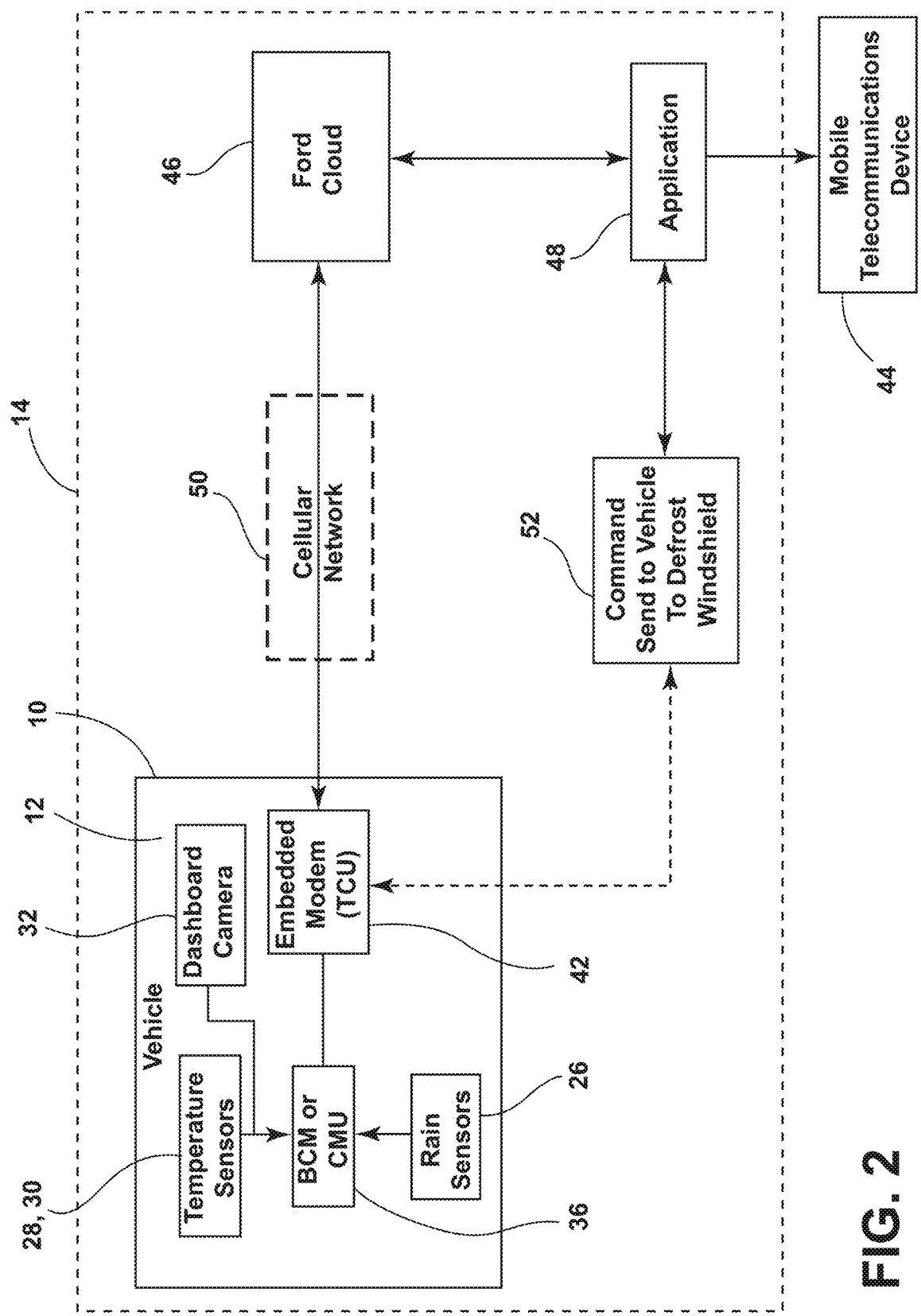
FIG. 2 is a boundary diagram for the climate control system, according to the present disclosure.

FIG. 2 depicts a boundary diagram for the climate control system 14. Specifically, FIG. 2 diagrammatically depicts communication between the body controller 36 and the telematics communication system 40. Again, the body controller 36 may communicate with the telematics communication system 40 using the modem 42 embedded on the body controller 36. Communication between the telematics communication system 40 and the body controller 36 allows the climate control system 14 to be activated using the mobile telecommunications device 44 remote from the vehicle 10. Stated differently, the telematics communication system 40 allows for communication between the body controller 36 and the cloud server 46 such that the mobile telecommunications device 44 may upload commands, such as, but not limited to, activating the defroster assembly 24 to defrost the windshield 18 to the cloud server 46. The body controller 36 may retrieve the commands from the cloud server 46 using the modem 42. Again, communication between the body controller 36 and the cloud server 46 is through the modem 42, which communicates with the cloud server 46 over a cellular network 50. The cellular network 50 may be, for example, a 5G, a long-term evolution (LTE), Bluetooth®, Wi-Fi®, or any other network able to transmit data between the cloud server 46 in the body controller 36.

In FIG. 2, the vehicle 10, as well as the vehicle components, such as the at least one humidity sensor 26, the first and second temperature sensors, 28, 30, and the camera 32 of the defroster assembly 24 in the climate control system 14, are schematically depicted. The mobile telecommunications device 44 communicates with the cloud server 46 through the application 48. The application 48 may be stored on the cloud server 46 and accessed through the mobile telecommunications device 44. Therefore, the application 48 may represent a back-end system used to communicate commands from the mobile telecommunications device 44 to the cloud server 46. Stated differently, the application 48 may allow for data entry from the mobile telecommunications device 44 to command the body controller 36 to activate the climate control system 14 to defrost the windshield 18 using the defroster assembly 24. In at least one other embodiment, the application 48 may be stored on the mobile telecommunications device 44 and also allow for data entry from the mobile telecommunications device 44 to command the body controller 36 to activate the climate control system 14 to set a pre-defined temperature of the interior area 12 of the vehicle 10. Likewise, in at least one other embodiment, the application 48 may allow for data entry from the mobile telecommunications device 44 to command the body controller 36 to activate other vehicle control sub-systems (not shown) based on a desired state or usage of the vehicle 10.

The application 48 may communicate with the body controller 36 by transmitting a notification 52 through the modem 42. The notification 52 may be either sent or received through the modem 42 from the body controller 36 or the application 48. The notification 52 may be indicative of a status of the vehicle 10, such as the windshield 18 being occluded, as previously described. For example, the body controller 36 may receive data from the humidity sensor 26, the first and second temperature sensors 28, 30, and the camera 32 to determine that the windshield 18 is occluded, as described above, and transmits the notification 52 of the status of an occluded windshield 18 to the mobile telecommunications device 44 through the modem 42 and cloud server 46. Likewise, the application 48 may wake the body controller 36 to determine the status of the windshield 18 in the interior area 12 of the vehicle 10. Also, the application 48 may transmit commands responsive to the notification 52 to the body controller 36 responsive to the status of the windshield 18.

Figure 3:
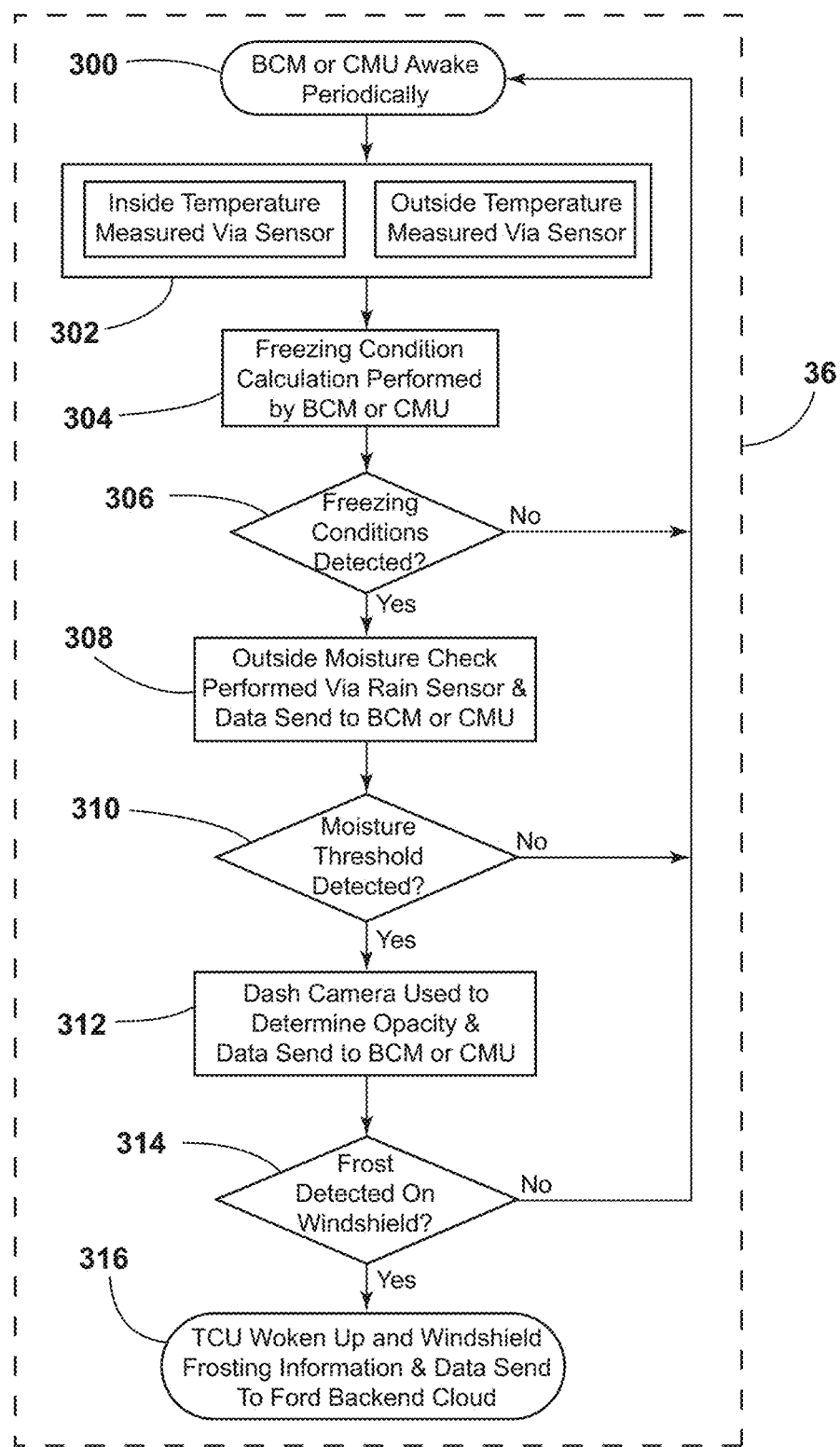
FIG. 3 is a control logic flow diagram for a body controller of the climate control system, according to the present disclosure.

FIG. 3 is a control logic flow diagram for the body controller 36 of the climate control system 14. Specifically, FIG. 3 depicts control logic used by the body controller 36 to determine the status of the windshield 18. As described above, the body controller 36 uses data from the humidity sensor 26, the first and second temperature sensors 28, 30 and the camera 32 to determine if moisture may have frozen on the outer surface 22 of the windshield 18. The body controller 36 may be woken periodically, or at predetermined intervals at 300 to determine the status of the windshield 18. For example, the body controller 36 may analyze usage data indicative of a travel pattern of the vehicle 10 at 300. The travel pattern of the vehicle 10 may be based on user routines and habits, such as, but not limited to, an approximate time the user leaves for or returns from work. Again, at 300, the telematics communication system 40 may wake the body controller 36, as described, to determine the status of the windshield 18.

At 302, the first and second temperature sensors 28, 30 may provide temperature data indicative of the interior and ambient temperature of the interior and exterior areas 12, 16 of the vehicle 10, respectively. The first and second temperature sensors 28, 30 may be thermometers, thermistors, thermocouples, or any other sensor that detects a temperature. At 302, the first temperature sensor 28 determines an interior temperature of the interior area 12 and the second temperature sensor 30 determines an ambient temperature of the exterior area 16, as previously described. The body controller 36, at 304, analyzes the interior and ambient temperatures to determine whether the interior and ambient temperatures are greater or less than the temperature threshold. The body controller 36 determines whether the interior and ambient temperatures are greater or less than the temperature threshold at 306. If, at 306, the interior and ambient temperatures are greater than the temperature threshold, the body controller 36 determines that a freezing condition is not present and returns to periodically checking the status at 300.

At 306, if the interior and ambient temperatures are less than the temperature threshold being indicative of a freezing condition, for example, below 32° F., the body controller 36 checks the moisture level of the outer surface 22 of the windshield 18. The body controller 36 checks the moisture level of the outer surface 22 of the windshield 18, at 308. The moisture level on the outer surface 22 of the windshield 18 is communicated, at 308, to the body controller 36 using the humidity sensor 26. Again, if the moisture level on the outer surface 22 of the windshield 18 is greater than a moisture threshold during the freezing condition indicated at 306, the windshield 18 may be occluded. At 310, the body controller 36 determines if the moisture level from the humidity sensor 26 is greater or less than the moisture threshold. If at 310, the body controller 36 determines that the moisture level is less than the moisture threshold, the body controller 36 may determine that the windshield 18 is not occluded and return to periodically checking the status at 300. At 310, if the body controller 36 determines that the moisture level is greater than the moisture threshold, the body controller 36 receives image data from the camera 32. The body controller 36 receives image data from the camera 32 at 312. At 312, the camera 32 provides image data of the inner surface 20 of the windshield 18.

The body controller 36, at 314, analyzes the image data from the camera 32 to determine a light refractive index of the inner surface 20 of the windshield 18. At 314, the body controller 36 determines if the light refractive index of the inner surface 20 of the windshield 18 is greater or less than an opacity threshold of the windshield 18. The opacity threshold of the windshield 18 determines if a light refractive index of the windshield 18 is such that light is visible through the windshield 18. The opacity threshold determines if moisture detected from the humidity sensor 26 has frozen on the outer surface 22 of the windshield 18 during freezing conditions detected by the first and second temperature sensors 28, 30. Therefore, at 314, the body controller 36 determines if the windshield 18 is occluded using the opacity threshold. If, at 314, the body controller 36 determines from the image data that the light refractive index of the inner surface 20 is greater than the opacity threshold, the body controller 36 determines that the windshield 18 is not occluded and returns to periodically checking the status at 300.

If, at 314, the body controller 36 determines from the image data that the light refractive index of the inner surface 20 of the windshield 18 is less than the opacity threshold, the body controller 36 determines that moisture has frozen on the outer surface 22 of the windshield 18 such that the windshield 18 is occluded. If, at 314, the body controller 36 determines that the windshield 18 is occluded, the body controller 36 wakes the telematics communication system 40 via the modem 42 to transmit the status of the windshield 18 through the notification 52 at 316. Again, the notification 52, at 316, may be transmitted to the cloud server 46 and the application 48, in which the application 48 may include predefined or one-time responses to the notification 52 to allow the body controller 36 to activate the defroster assembly 24 to effectuate heat transfer from the inner surface 20 to the outer surface 22 of the windshield 18. Transmitting the notification 52 of the status of the windshield 18 at 316 allows for greater personalization of the interior area 12 of the vehicle 10 by allowing the defroster assembly 24 to be activated despite a user being remote from the vehicle 10.

Figure 4:
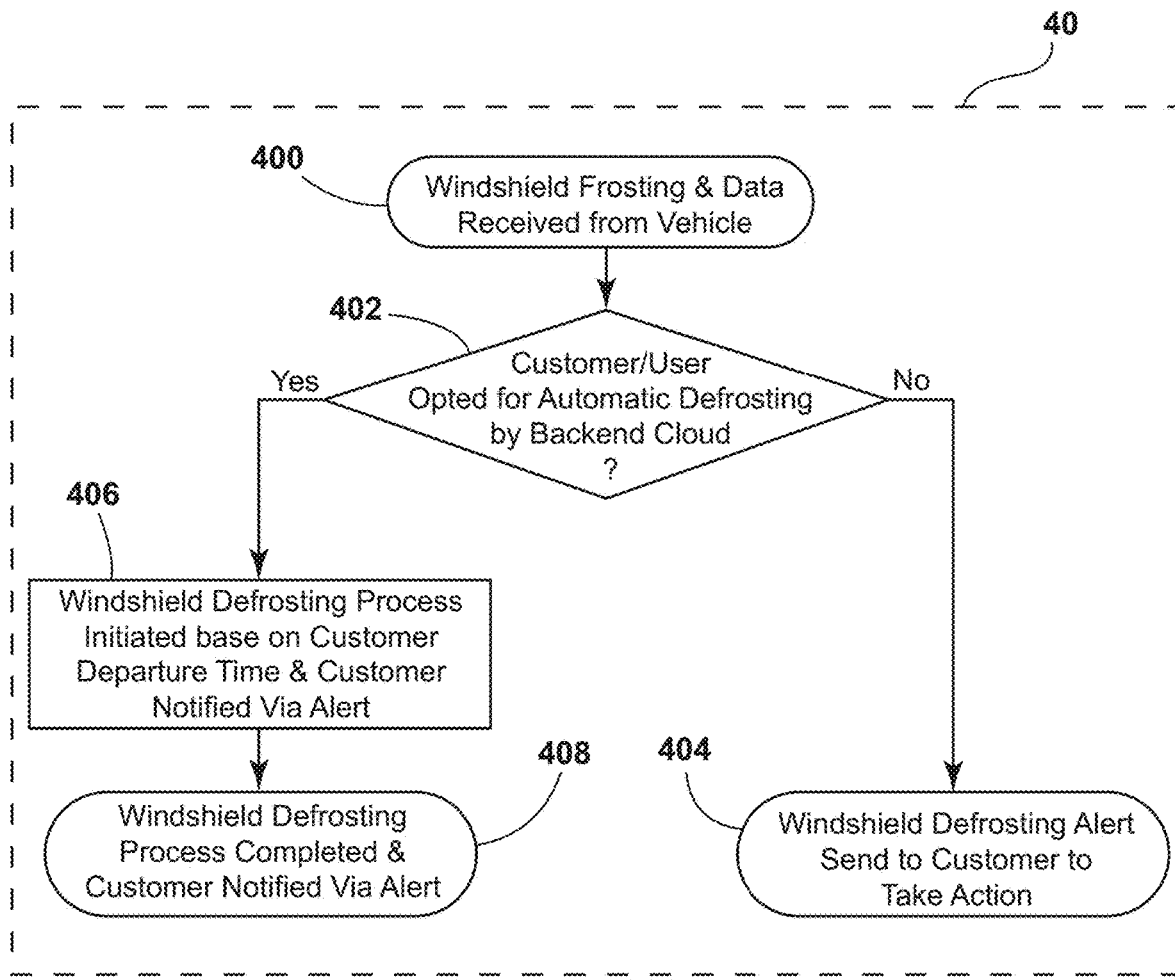
FIG. 4 is a control logic flow diagram for a telematics communication system for the climate control system, according to the present disclosure.

FIG. 4 depicts control logic for the telematics communication system 40 to communicate the notification 52 of the status of the windshield 18 to the cloud server 46. Specifically, FIG. 4 depicts control logic for the telematics communication system 40 to push the notification 52 to the mobile telecommunications device 44 remote from the vehicle 10. As shown in FIG. 4, in this example, the body controller 36 determines that the outer surface 22 of the windshield 18 is occluded, and the telematics communication system 40 is transmitting the notification 52 to the mobile telecommunications device 44. As described above, the application 48 may include predefined, or one-time, responses to the notification 52. FIG. 4 provides control logic for responding to the notification 52 using settings data in the application 48 predefined responses, as well as for one-time responses through interaction with the mobile telecommunications device 44 in the application 48. The settings data may be indicative of control parameters for the climate control system 14 such that body controller 36 operates the defrosters assembly 24 based on the settings data.

At 400, the telematics communication system 40 receives the notification 52 through the modem 42 indicative of the status of the windshield 18 from the body controller 36. Again, the telematics communication system 40 is interconnected with the body controller 36 using the modem 42, which is embedded in the body controller 36. At 400, the status of the windshield 18 may be such that the notification 52 indicates that the windshield 18 is occluded. At 402, the telematics communication system 40 transmits the notification 52 to the cloud server 46, where the notification 52 is accessed by the application 48. At 402, the application 48 uses the settings data stored in the application 48 to determine operation of the defroster assembly 24 through the body controller 36. If, at 402, the settings data stored on the application 48 is indicative of a non-automated response to the notification 52, the application 48 pushes the notification 52 to the mobile telecommunications device 44. The mobile telecommunications device 44 receives the notification 52 from the application 48 at 404. At 404, a one-time response to the notification 52 may be initiated on the mobile telecommunications device 44. The one-time response to the notification 52 may include control parameters for the climate control system 14.

If, at 402, the settings data is indicative of an automated response to the notification 52, the telematics communication system 40 commands the body controller 36 to activate the defroster assembly 24 at 406. At 406, the telematics communication system 40 uses the settings data to control parameters of the climate control system 14. For example, the settings data may be indicative of a set temperature of the interior area 12 of the vehicle 10, and the telematics communication system 40 may command the body controller 36 to activate the defroster assembly 24 to achieve the set temperature stored in the settings data. In a similar example, at 406, the settings data may be indicative of an optimized fan speed to increase an amount of air above the temperature threshold through the vent 38 to effectuate heat transfer from the inner surface 20 to the outer surface 22 of the windshield 18.

At 408, the telematics communication system 40 may communicate the status of the windshield 18 through the modem 42 of the body controller 36. The body controller 36 may continuously wake the defroster assembly 24 to determine the status of the windshield 18. Specifically, the body controller 36 wakes the defroster assembly 24 at predetermined intervals to continuously monitor and update the telematics communications system 40 of the status of the windshield 18. In at least one embodiment, at 408, the predetermined intervals may be based on environment data of the exterior area 16 of the vehicle 10. The environment data of the exterior area 16 may include, but is not limited to, precipitation totals, temperature, wind direction, or any other environmental factor occurring in the exterior area 16 of the vehicle 10. At 408, the telematics communication system 40 provides a second notification to inform the mobile telecommunications device 44 through the application 48 that the windshield 18 has sufficiently defrosted based on the status from the body controller 36. This allows a user to personalize and customize operation of the climate control system 14 based on automated settings or the notification 52 indicating an occluded windshield 18.

It is to be understood that variations and modifications can be made on the aforementioned structure without departing from the concepts of the present invention, and further it is to be understood that such concepts are intended to be covered by the following claims unless these claims by their language expressly state otherwise.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A climate control system for a vehicle comprising:
   a defroster assembly having a temperature sensor that detects an interior temperature of an interior of the vehicle, a camera disposed within the interior that has a lens facing a windshield, and at least one vent directed at the windshield;
   a body controller that, responsive to a temperature of the interior being less than a temperature threshold, and a light refractive index of the windshield being less than an opacity threshold, outputs a status of the windshield; and
   a telematics communication system that, responsive to the status from the body controller, transmits a notification to an application stored on a mobile telecommunications device, wherein the telematics communication system, responsive to interaction with the application on the mobile telecommunications device from the notification, automatically wakes the body controller to start the vehicle and activates the defroster assembly based on a vehicle departure time such that the vent directs air having a temperature being greater than the temperature threshold to the windshield.

2. The climate control system of claim 1, wherein the defroster assembly has at least one humidity sensor disposed on an outer surface of the windshield that detects moisture on the windshield, wherein the body controller, responsive to a moisture level from the humidity sensor being less than a moisture threshold, outputs a status.

3. The climate control system of claim 1, wherein the interaction between the telematics communication controller and the mobile telecommunications device is a pre-defined response stored on the application.

4. The climate control system of claim 1, wherein the body controller wakes the defroster assembly in predetermined intervals to determine the status.

5. The climate control system of claim 4, wherein the predetermined intervals are defined based on usage data being indicative of a travel pattern of the vehicle.

6. The climate control system of claim 4, wherein the predetermined intervals are defined based on environment data exterior to the vehicle.

7. A vehicle comprising:
   a windshield having outer and inner surfaces; and
   a climate control system having a defroster assembly including:
      at least one vent directed at the inner surface;
      at least one humidity sensor disposed on the outer surface;
      a camera disposed within an interior of the vehicle such that a lens faces the inner surface;
      a body controller that, responsive to a moisture level from the humidity sensor being greater than a moisture threshold and a light refractive index of the windshield being less than an opacity threshold, outputs a status of the windshield to an embedded modem; and
      a telematics communication system including a cloud server that interfaces with the body controller via the modem such that, responsive to the status, the cloud server transmits a notification through an application on a mobile telecommunications device exterior to the vehicle, wherein the application stores pre-defined responses as settings data such that responsive to the notification, the mobile device transmits the settings data to the cloud server that instructs the body controller to automatically start the vehicle and activate the climate control system based on a vehicle departure time to initiate airflow from the vent based on the settings data.

8. The vehicle of claim 7, wherein the climate control system includes a temperature sensor that detects a temperature of an interior of the vehicle, wherein the body controller, responsive to a moisture level from the humidity sensor being less than a moisture threshold, outputs a status.

9. The vehicle of claim 7, wherein the settings data is indicative of control parameters for the climate control system.

10. The vehicle of claim 7, wherein the body controller wakes the climate control system in predetermined intervals to determine the status.

11. The vehicle of claim 10, wherein the predetermined intervals are defined based on usage data being indicative of a travel pattern of the vehicle.

12. The vehicle of claim 10, wherein the predetermined intervals are defined based on environment data exterior to the vehicle.

\* \* \* \* \*